No. 839,245. PATENTED DEC. 25, 1906.
M. H. WILLIAMS.
CATTLE GUARD.
APPLICATION FILED AUG. 15, 1906.
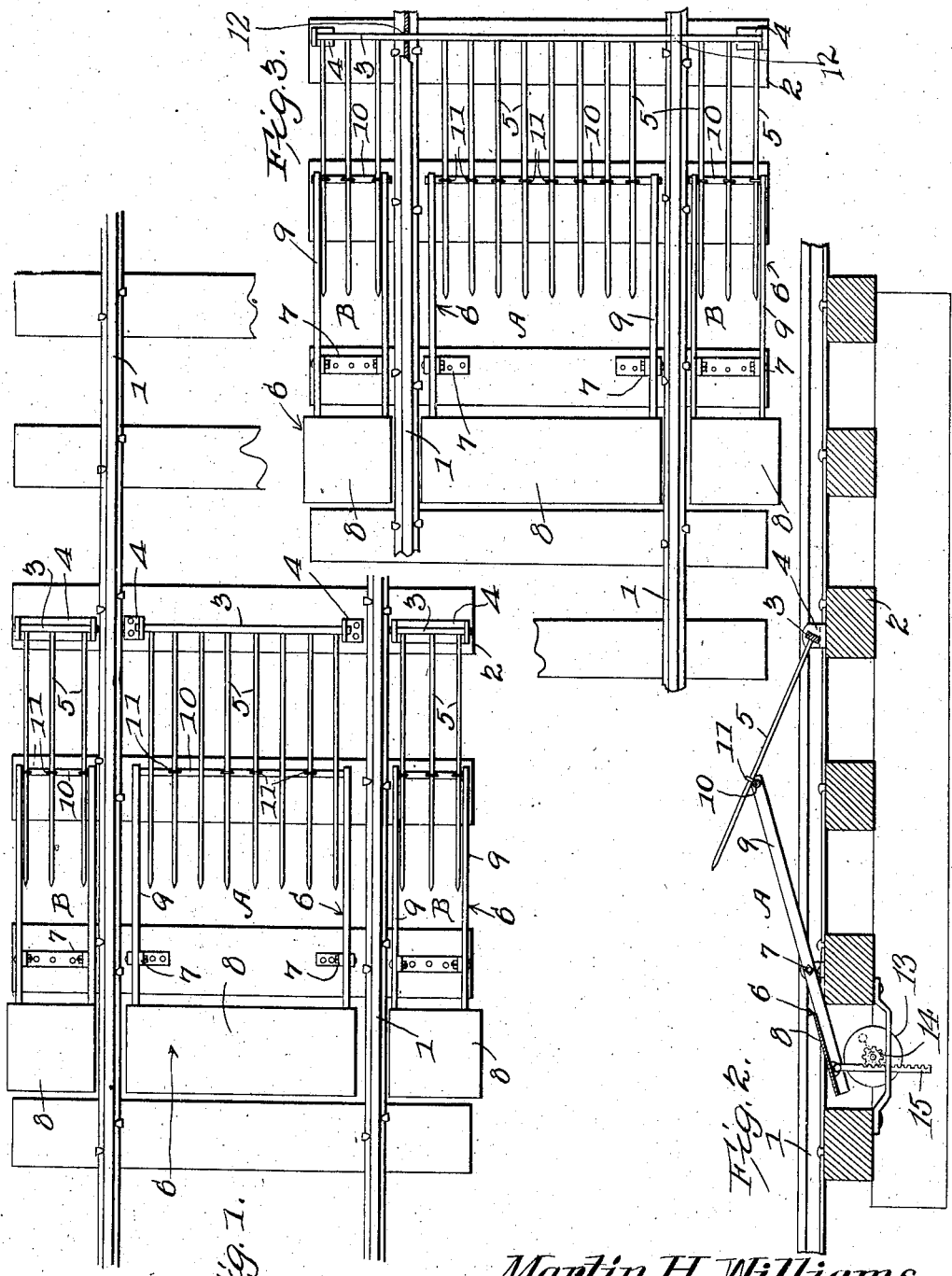
Martin H. Williams,
INVENTOR.
WITNESSES:
By C. A. Snow & Co.
ATTORNEYS

UNITED STATES PATENT OFFICE.

MARTIN HARDIN WILLIAMS, OF SONORA, KENTUCKY.

CATTLE-GUARD.

No. 839,245.  Specification of Letters Patent.  Patented Dec. 25, 1906.

Application filed August 15, 1906. Serial No. 330,713.

*To all whom it may concern:*

Be it known that I, MARTIN HARDIN WILLIAMS, a citizen of the United States, residing at Sonora, in the county of Hardin and State of Kentucky, have invented a new and useful Cattle-Guard, of which the following is a specification.

This invention has relation to cattle-guards; and it consists in the novel construction and arrangement of its parts, as hereinafter shown and described.

The object of the invention is to provide a cattle-guard adapted to be used at railroad-crossings for the purpose of preventing cattle from passing along the railroad-track, or it may be used to advantage at other places as conditions or occasion may require.

The device consists, primarily, of a series of pickets or guards which normally lie between the rails of the track and extend parallel thereto. Also similar pickets are located on the outer sides of the rail. The said pickets are fixed at their ends to a bar or series of bars that extend transversely with relation to the track and are pivotally supported. A trip is located in advance of the pickets and is so mounted upon the track that when its platform is stepped upon by an animal it descends between the cross-ties and the end of said trip located at the opposite side of the pivotal point thereof is raised in the air. This movement lifts the free ends of said pickets and inclines the same at an angle of approximately thirty to thirty-five degrees and presents an obstruction to the animal that is about to pass over the cattle-guard. All of the parts normally rest far enough below the surface of the track as not to interfere with the traffic upon the railroad.

In the accompanying drawings, Figure 1 is a top plan view of the cattle-guard. Fig. 2 is a longitudinal section of the cattle-guard, showing the pickets in elevated position; and Fig. 3 is a top plan view of a modified form of a cattle-guard.

In the form of the invention shown in Fig. 1 the cattle-guard consists of three sections—the central section A and the two side sections B B. As the construction of all of the said sections is the same, the description of one will answer for all, the only difference being in lateral dimensions, as the sections B B are not so wide as the section A. The section A is adapted to be located between the rails 1 1 of the track, while the sections B are located on the ends of the cross-ties 2 on the outer sides of the rails 1. Each section is provided with a cross-rod 3, which is journaled at its ends in suitable bearings 4 4, which in turn are secured to the cross-tie 2. The pickets 5 are attached at one end to the cross-rod 3 and extend parallel to each other.

The trip 6 is pivotally suppported at the point 7 and is provided at one end with a platform 8 of sufficient width to render it impossible for an animal to pass over the same without treading thereon. The arms 9 extend from the said platform 8 toward the pickets, and the said arms are either attached to or merge into the cross-arm 10, which is located under the free ends of the pickets 5. The said cross-arm 10 is provided at suitable intervals with the eyes 11 11, which receive the pickets 5 5. Normally the pickets 5 5 lie below the upper edges of the track-rails 1 1. However, when an animal approaches and steps upon the platform 8 the said platform is caused to descend and the arms 9 9 and the cross-arm 10 are elevated. Consequently the free ends of the pickets 5 are swung up, and the said ends of the said pickets present a barrier to the passage of the animal upon the track. As soon as the animal removes his foot from the platform 8 the said platform rises and the pickets descend into their normal positions, and the parts are out of the way of the trains that pass along the track.

As above indicated, the form of invention shown in Fig. 1 consists of three sections—namely, A and B B—the section A being located between the track-rails 1, while the sections B B are located one on each side of the track.

The operation of the sections B B is the same as that described for the section A. As shown in Fig. 3, the trip mechanism and the pickets are of the same construction and arrangement as above described for Figs. 1 and 2. The operation of the device is substantially the same also, the difference in construction being that the bearings 4 4 are eliminated and the rod 3 is journaled at points within its ends in perforations 12 made in the track-rails 1—that is to say, the said bar 3 is journaled in the rails 1 and its intermediate portion corresponds to the section A of Fig. 1, while its end portions correspond to the sections B B of Fig. 1.

In the operation of the form of device shown in Fig. 3 all of the pickets 5 will assume an inclined position when any one of the three trips is trod upon by the animal.

As shown in Fig. 2, a gong or bell 13 is mounted under the platform 8, a gear-wheel 14 is attached to the shaft of the hammer of the bell, and the gear-rod 15 meshes with the said gear-wheel. Consequently when the platform 8 is depressed the said bell 13 is sounded and an audible alarm is given, which will scare animals away from the guard.

Having described my invention, what I claim as new, and desire to secure by Letters Patent, is—

1. A cattle-guard comprising a rod journaled transversely with relation to a track, pickets attached to said rod, and a pivoted trip mechanism having eyes which receive said pickets.

2. A cattle-guard consisting of a rod journaled transversely with relation to a track, pickets attached to said rod, a trip pivotally supported and having a tread extending to one side of said pivotal support and adapted to descend between the track-ties, arms extending from said tread toward said rod, said arms being connected by a cross-arm said cross-arm having eyes which receive said pickets.

In testimony that I claim the foregoing as my own I have hereto affixed my signature in the presence of two witnesses.

MARTIN HARDIN WILLIAMS.

Witnesses:
J. T. SANDERS,
JNO. A. GARDNER.